United States Patent [19]
O'Sullivan

[11] 3,977,774
[45] Aug. 31, 1976

[54] VEHICLE REAR VIEW MIRROR WITH SLIDABLE PARALLEL SECTIONS

[76] Inventor: Bernard O'Sullivan, 120-31 DeKruif Place, Bronx, N.Y. 10475

[22] Filed: Jan. 30, 1975

[21] Appl. No.: 545,336

[52] U.S. Cl. ............................................. 350/304
[51] Int. Cl.² ............................................ G02B 5/08
[58] Field of Search .......... 350/304, 303, 299, 307, 350/306; 248/475 R, 480, 476

[56] References Cited
UNITED STATES PATENTS

| | | | |
|---|---|---|---|
| 1,969,415 | 8/1934 | Ostroff | 350/304 |
| 2,582,651 | 1/1952 | Peterson | 350/304 |
| 2,663,225 | 12/1953 | Blan | 350/304 |

FOREIGN PATENTS OR APPLICATIONS

| | | | |
|---|---|---|---|
| 1,083,268 | 1/1955 | France | 350/306 |
| 1,098,313 | 1/1968 | United Kingdom | 350/306 |

*Primary Examiner*—John K. Corbin
*Assistant Examiner*—Jon W. Henry
*Attorney, Agent, or Firm*—Daniel Jay Tick

[57] ABSTRACT

A first rear view mirror is affixed to a frame at a predetermined distance from the side of a vehicle. A second rear view mirror is releasably affixed to the frame at the predetermined distance from the vehicle adjacent the first mirror or at a distance greater than the predetermined distance whereby the second mirror provides a rear view behind a wide obstruction behind the first mirror.

2 Claims, 4 Drawing Figures

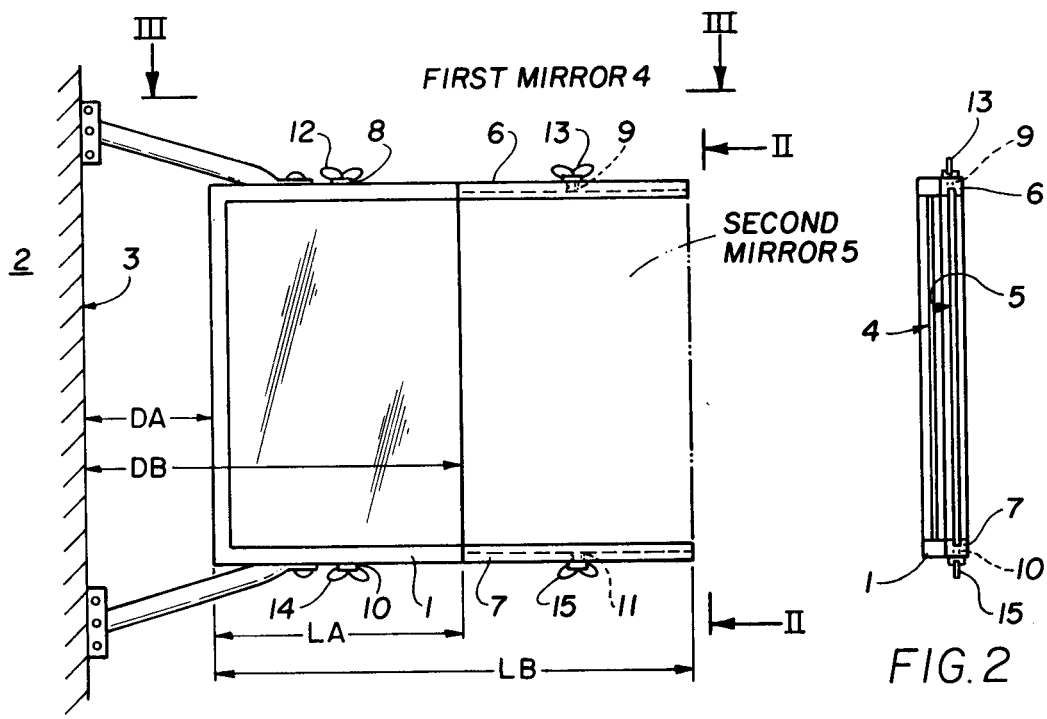
FIG. 1
FIG. 2
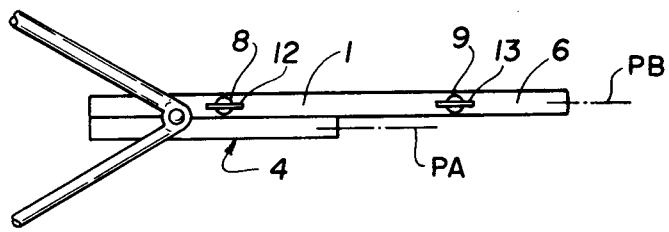
FIG. 3
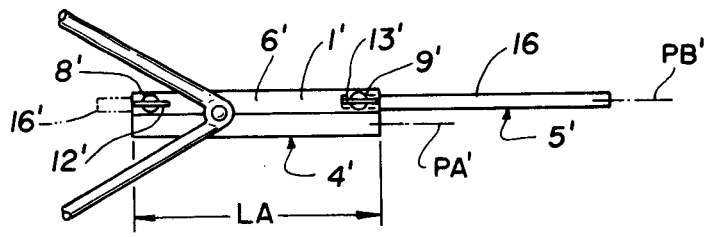
FIG. 4

VEHICLE REAR VIEW MIRROR WITH SLIDABLE PARALLEL SECTIONS

BACKGROUND OF THE INVENTION

The present invention relates to a vehicle rear view mirror device. More particularly, the invention relates to a rear view mirror device for a motor vehicle which is occasionally used to haul wide loads such as campers, trailers, and so on.

The usual rear view mirror of a motor vehicle is totally inadequate when the vehicle is used to haul a wide load such as a trailer, camper, or the like. In such cases, the load obstructs the rear view mirror, so that such mirror is totally useless.

The principal object of the invention is to provide a vehicle rear view mirror device which functions efficiently, effectively and reliably as a rear view mirror for a motor vehicle and for a motor vehicle hauling a wide load.

An object of the invention is to provide a vehicle rear view mirror device of simple structure, which device is affixed to new and existing motor vehicles with facility, convenience and rapidity, and functions to provide a rear view for the vehicle when the vehicle is unencumbered and when the vehicle is hauling a wide load.

Another object of the invention is to provide a vehicle rear view mirror device which is inexpensive in manufacture and provides a rear view for the operator of the vehicle behind a wide obstruction such as, for example, a trailer, camper, or the like.

BRIEF SUMMARY OF THE INVENTION

In accordance with the invention, a vehicle rear view mirror device comprises a support frame affixed to a vehicle and extending from a side thereof. A first rear view mirror is affixed to the frame at a predetermined distance from the side of the vehicle. A second rear view mirror is provided. Fastening means releasably affixes the second mirror to the frame in a first position in substantially parallel adjacent relation with the first mirror and in a second position at a distance greater than the predetermined distance from the vehicle in a manner whereby the second mirror provides a rear view behind a wide obstruction behind the first mirror.

The frame includes a pair of spaced substantially parallel substantially coplanar guide members for guiding the second mirror in a plane substantially parallel to and adjacent that of the first mirror. The second mirror is slidably mounted in the guide members.

The fastening means comprises internally threaded bores formed through the guide members at spaced predetermined points and wing screws threadedly engaged in the bores for abutting the corresponding edges of the second mirror to secure the second mirror in position.

In one embodiment, the first mirror has a predetermined length. The guide members extend for approximately twice the predetermined length.

In another embodiment, the guide members extend for the predetermined length and the second mirror has top and bottom edges. A mirror frame on the top and bottom edges of the second mirror is slidably mounted in the guide members and extends a fraction longer than the predetermined length.

BRIEF DESCRIPTION OF THE DRAWING

In order that the invention may be readily carried into effect, it will now be described with reference to the accompanying drawing, wherein:

FIG. 1 is a view of an embodiment of the vehicle rear view mirror device of the invention;

FIG. 2 is a view, taken along the lines II—II, of FIG. 1;

FIG. 3 is a view, taken along the lines III—III, of FIG. 1; and

FIG. 4 is a view, similar to that of FIG. 3, of another embodiment of the vehicle rear view mirror device of the invention.

In the FIGS., the same components are identified by the same reference numerals.

DETAILED DESCRIPTION OF THE INVENTION

The vehicle rear view mirror device of the invention comprises a support frame 1 (FIGS. 1 to 3) or 1' (FIG. 4) affixed to a vehicle 2 and extending from a side 3 thereof (FIG. 1).

A first rear view mirror 4 (FIGS. 1 to 3) or 4' (FIG. 4) is affixed to the frame 1 or 1' at a predetermined distance DA from the side 3 of the vehicle 2 (FIG. 1).

A fastening device releasably affixes a second mirror 5 (FIGS. 1 and 2) or 5' (FIG. 4) to the frame 1 or 1' in a first position in substantially parallel adjacent relation with the first mirror 4 or 4'. The fastening device also releasably affixes the second mirror 5 or 5' in a second position, shown by broken lines in FIG. 1, at a distance DB greater than the predetermined distance DA from the vehicle 2 (FIG. 1) in a manner whereby the second mirror provides a rear view behind a wide obstruction behind the first mirror 4 or 4'.

In the embodiments of FIGS. 1 to 3 and FIG. 4, the frame 1 or 1' includes a pair of spaced substantially parallel substantially coplanar guide members 6 and 7 (FIGS. 1 and 2) or 6' (FIG. 4) and 7' (not shown in the FIGS.). The guide members 6 and 7 and 6' and 7' guide the second mirror 5 or 5' in a plane PB (FIG. 3) or PB' (FIG. 4) substantially parallel to and adjacent the plane PA (FIG. 3) or PA' (FIG. 4) of the first mirror 4 or 4'. The second mirror 5 or 5' is slidably mounted in the guide members 6 and 7 or 6' and 7', respectively.

The fastening device comprises internally threaded bores 8, 9, 10 and 11 (FIG. 1) or 8', 9' (FIG. 4), 10' and 11' (not shown in the FIGS.) formed through the guide members 6 and 7 and 6' and 7', respectively, at spaced predetermined points. Wing screws 12, 13, 14 and 15 (FIG. 1) or 12', 13' (FIG. 4), 14' and 15' (not shown in the FIGS.) are threadedly engaged in the bores 8, 9, 10 and 11, and 8', 9', 10' and 11', respectively, and, when tightened, abut the corresponding edges of the second mirror 5 or 5' to secure the second mirror in position. When the wing screws are loosened, the second mirror 5 or 5' is movable in the guide members 6 and 7 or 6' and 7' with facility.

In the embodiment of FIGS. 1 to 3, the first mirror 4 has a predetermined length LA. The guide members 6 and 7 extend for a length LB which is approximately twice the predetermined length (FIG. 1).

In the embodiment of FIG. 4, the first mirror 4' has a predetermined length LA. The guide members 6' and 7' extend for the predetermined length LA. A mirror frame 16 (FIG. 4) and 17 (not shown in the FIGS.) is provided on the top and bottom edges, respectively, of the second mirror 5'. The mirror frame 16, 17 is slidably mounted in the guide members 6' and 7' and extends a fraction longer than the predetermined length LA.

In the embodiment of FIGS. 1 to 3, when the second mirror 5 is positioned behind the first mirror 4, in the view of FIG. 1, and the wind screws 12 and 14 are tightened, the second mirror is obstructed by the first mirror and is inoperative. When the second mirror 5 is moved to its position shown by broken lines in FIG. 1, and the wing screws 13 and 15 are tightened, the second mirror provides a rear view behind a wide obstruction behind the first mirror 4.

In the embodiment of FIG. 4, when the second mirror 5' is positioned behind the first mirror 4', as shown by broken lines, and the wing screws 12' and 14' are tightened, the second mirror is obstructed by the first mirror and is inoperative. When the second mirror 5' is moved to its position shown by solid lines in FIG. 4, and the wing screws 13' and 15' are tightened, the second mirror provides a rear view behind a wide obstruction behind the first mirror 4'.

While the invention has been described by means of specific examples and in specific embodiments, I do not wish to be limited thereto, for obvious modifications will occur to those skilled in the art without departing from the spirit and scope of the invention.

I claim:

1. A vehicle rear view mirror device, comprising
a support frame affixed to a vehicle and extending from a side thereof;
a first rear view mirror affixed to the frame at a predetermined distance from the side of the vehicle;
a second rear view mirror, said frame including a pair of spaced substantially parallel substantially coplanar guide members for guiding the second mirror in a plane substantially parallel to and adjacent that of the first mirror and said second mirror being slidably mounted in the guide members; and
fastening means for releasably affixing the second mirror to the frame in a first position in substantially parallel adjacent relation with the first mirror and in a second position at a distance greater than the predetermined distance from the vehicle in a manner whereby the second mirror provides a rear view behind a wide obstruction behind the first mirror, said fastening means comprising internally threaded bores formed through the guide members at spaced predetermined points and wing screws threadedly engaged in the bores for abutting the corresponding edges of the second mirror to secure the second mirror in position.

2. A vehicle rear view mirror device, comprising
a support frame affixed to a vehicle and extending from a side thereof;
a first rear view mirror affixed to the frame at a predetermined distance from the side of the vehicle, said first mirror having a predetermined length;
a second rear view mirror, said frame including a pair of spaced substantially parallel substantially coplanar guide members for guiding the second mirror in a plane substantially parallel to and adjacent that of the first mirror, said guide members extending for approximately twice the predetermined length and said second mirror being slidably mounted in the guide members; and
fastening means for releasably affixing the second mirror to the frame in a first position in substantially parallel adjacent relation with the first mirror and in a second position at a distance greater than the predetermined distance from the vehicle in a manner whereby the second mirror provides a rear view behind a wide obstruction behind the first mirror, said fastening means comprising internally threaded bores formed through the guide members at spaced predetermined points and wing screws threadedly engaged in the bores for abutting the corresponding edges of the second mirror to secure the second mirror in position.

* * * * *